(12) United States Patent
Shiotsuki et al.

(10) Patent No.: US 8,521,093 B2
(45) Date of Patent: Aug. 27, 2013

(54) WIRELESS COMMUNICATIONS APPARATUS, WIRELESS COMMUNICATIONS METHOD, PROGRAM, AND INTEGRATED CIRCUIT

(75) Inventors: Akihiko Shiotsuki, Osaka (JP); Toyoshi Yamada, Osaka (JP); Osamu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 224 days.

(21) Appl. No.: 13/132,704

(22) PCT Filed: Jun. 1, 2010

(86) PCT No.: PCT/JP2010/003664
§ 371 (c)(1),
(2), (4) Date: Jun. 3, 2011

(87) PCT Pub. No.: WO2010/140349
PCT Pub. Date: Dec. 9, 2010

(65) Prior Publication Data
US 2011/0244808 A1    Oct. 6, 2011

(30) Foreign Application Priority Data
Jun. 2, 2009 (JP) ................................ 2009-133550

(51) Int. Cl.
*H04B 17/00* (2006.01)
(52) U.S. Cl.
USPC ............... 455/67.11; 455/562.1; 455/561; 455/63.4; 455/575.8; 370/334; 370/332
(58) Field of Classification Search
None
See application file for complete search history.

(56) References Cited

U.S. PATENT DOCUMENTS

| | | | |
|---|---|---|---|
| 7,295,811 B2 | 11/2007 | Stern-Berkowitz et al. | |
| 7,308,264 B2 | 12/2007 | Stern-Berkowitz et al. | |
| 7,369,510 B1 * | 5/2008 | Wong et al. | 370/252 |
| 7,716,706 B2 | 5/2010 | Takagi et al. | |
| 7,764,957 B2 | 7/2010 | Stern-Berkowitz et al. | |
| 8,014,305 B1 * | 9/2011 | Gilbert et al. | 370/252 |
| 2003/0032403 A1 | 2/2003 | Ono | |

(Continued)

FOREIGN PATENT DOCUMENTS

| | | |
|---|---|---|
| JP | 2003-60539 | 2/2003 |
| JP | 2004-15800 | 1/2004 |

(Continued)

OTHER PUBLICATIONS

International Search Report issued Aug. 10, 2010 in corresponding International Application No. PCT/JP2010/003664.

*Primary Examiner* — Zhiyu Lu
(74) *Attorney, Agent, or Firm* — Wenderoth, Lind & Ponack, L.L.P.

(57) ABSTRACT

A wireless communications apparatus (100) includes: antennas (111, 112, and 113); a threshold identifying unit (141) which measures a first radio propagation environment parameter by using a specific directional pattern, and identifies a threshold, from among thresholds, which corresponds to the measured first radio propagation environment parameter; a directional pattern selecting unit (142) which performs test communications by sequentially switching directional patterns, and selects a directional pattern having an actual throughput, calculated from a measurement value of a second radio propagation environment parameter, greater than the threshold; and a threshold adjusting unit (143) which changes the threshold identified by the threshold identifying unit (141), according to the number of test communications that is the number of the directional patterns used for the test communications performed by the directional pattern selecting unit (142).

15 Claims, 12 Drawing Sheets

(56) References Cited

U.S. PATENT DOCUMENTS

| | | |
|---|---|---|
| 2003/0148744 A1 | 8/2003 | Ide et al. |
| 2003/0228857 A1 | 12/2003 | Maeki |
| 2005/0152315 A1 | 7/2005 | Ishidoshiro |
| 2005/0170800 A1 | 8/2005 | Taromaru et al. |
| 2005/0176385 A1 | 8/2005 | Stern-Berkowitz et al. |
| 2005/0176469 A1 | 8/2005 | Stern-Berkowitz et al. |
| 2005/0289607 A1 | 12/2005 | Takagi et al. |
| 2006/0003773 A1 | 1/2006 | Miyata et al. |
| 2007/0058662 A1* | 3/2007 | Yoshikawa .................. 370/447 |
| 2007/0202921 A1 | 8/2007 | Stern-Berkowitz et al. |
| 2007/0207757 A1 | 9/2007 | Qi et al. |

FOREIGN PATENT DOCUMENTS

| | | |
|---|---|---|
| JP | 2005-167772 | 6/2005 |
| JP | 2005-217849 | 8/2005 |
| JP | 2006-14059 | 1/2006 |
| JP | 2007-521783 | 8/2007 |

* cited by examiner

FIG. 10

| RSSI0 measured in S102 | The number of test communications performed before directional pattern is selected | The number of times that the number of test communications of RSSI0 = -70 is consecutively 1 |
|---|---|---|
| ... | ... | |
| -68 | 5 | |
| -70 | 1 | 1 |
| -64 | 1 | |
| -72 | 4 | |
| -70 | 1 | 2 |
| -70 | 2 | 0 |
| -66 | 2 | |
| -70 | 1 | 1 |
| -74 | 8 | |
| -64 | 2 | |
| -66 | 3 | |
| -70 | 1 (Currently being selected) | 2 (Currently being selected) |

FIG. 11

| RSSI0 measured in S102 | The number of test communications performed before directional pattern is selected | The number of times that the number of test communications of RSSI0 = -70 is consecutively 1 |
|---|---|---|
| ... | ... | |
| -68 | 5 | |
| -70 | 1 | 1 |
| -64 | 1 | |
| -72 | 4 | |
| -70 | 1 | 2 |
| -70 | 1 | 3 |
| -66 | 2 | |
| -70 | 1 | 4 |
| -74 | 8 | |
| -64 | 2 | |
| -66 | 3 | |
| -70 | 1 (Currently being selected) | 5 (Currently being selected) |

WIRELESS COMMUNICATIONS APPARATUS, WIRELESS COMMUNICATIONS METHOD, PROGRAM, AND INTEGRATED CIRCUIT

TECHNICAL FIELD

The present invention relates to wireless communications apparatuses, and in particular, to a wireless communications apparatus having a variable-directivity antenna device which changes the directivity of the antenna according to the changes in the radio propagation environment.

BACKGROUND ART

Of various types of networks in which information terminals are connected to one another, wireless communications have advantages over wired communications. Examples of the advantages include excellent terminal portability and placement flexibility, and a lightweight body achievable due to elimination of cable wires. Thus, the wireless communications apparatuses are now used not only for conventional usage, that is, data transmission used with personal computers, but also for transmitting video or audio by being incorporated in many kinds of home electrical appliances.

While the wireless communications apparatuses have such advantages, there is also a drawback that transmission characteristics may be degraded because communications is performed by emitting electromagnetic waves into space. More specifically, the space where many reflectors are present is affected by fading caused due to arrival radio waves (delay waves) reflected from an object. In the environment where a transmitting apparatus and a receiving apparatus are remotely present, insufficient strength of received signals can cause reception errors.

As a measure for reducing these negative influences, there is a method for stabilizing transmission by controlling the directivity of a transmitting and receiving antenna according to the radio propagation environment. One example of such technique is a smart antenna technique disclosed in Patent Literature 1 (hereinafter, referred to as PTL 1).

The smart antenna disclosed in PTL 1 changes weights for input and output signals of antenna elements, to change the directivity of the antenna through signal processing operations. In the smart antenna disclosed in PTL 1, the optimal configuration is determined by scanning all antenna configurations.

CITATION LIST

Patent Literature

[PTL 1] Japanese Patent Application Publication No. 2004-15800

SUMMARY OF INVENTION

Technical Problem

PTL 1 discloses a method for determining an optimal configuration of the smart antenna by scanning all antenna configurations, that is, by scanning the directivities obtained by weighting operations of received signals. The method allows the antenna configuration with optimal transmission characteristics to be steadily selected.

However, in the method disclosed in PTL 1, it takes a long time to scan all antenna configurations. As a result, tracking of the antenna configuration to the changes in the radio propagation environment is degraded. Furthermore, since it is necessary to frequently switch the antenna configuration during the scan, there is a concern that a sudden change in a received signal caused due to the switching of the antenna configuration adversely affects the transmission characteristics.

The scanning time can be reduced by sequentially performing test communications with each antenna directivity, and selecting the directivity which provides a communications performance which exceeds a predetermined threshold. However, it is difficult to uniquely determine an appropriate threshold for a wireless communications apparatus. More specifically, scanning all antenna directivities may be necessary, or an inappropriate antenna directivity may be selected, depending on the setting of the threshold.

FIG. 12 is a graph plotting a relationship between actual measurement values of throughput between wireless communications apparatuses and received signal strength indicator (hereinafter, referred to as RSSI) at a receiving wireless communications apparatus.

In FIG. 12, a dashed line 1201 represents a behavior when a transmitting wireless communications apparatus is a personal computer (hereinafter, referred to as PC) including a central processing unit (hereinafter, referred to as CPU) with a relatively low capability. In FIG. 12, a solid line 1202 represents a behavior when a transmitting wireless communications apparatus is a PC including a CPU with a relatively high capability. In FIG. 12, a dotted line 1203 represents a behavior when a transmitting wireless communications apparatus is an embedded appliance. On the other hand, the capability of a receiving wireless communications apparatus is constant.

As shown in FIG. 12, communications performance greatly varies depending on not only specifications of the receiving wireless communications apparatus, but also specifications of the transmitting wireless communications apparatus, that is a communications partner. However, it is not easy for the apparatuses which perform wireless communications to know the specifications of the other apparatus. In the method for determining the antenna directivity by using the threshold, determining the threshold is a problem.

The present invention has been conceived in view of such a condition, and has an object to provide a wireless communications apparatus which is capable of appropriately adjusting the threshold that is a criterion for determining the directivity, according to communications environments.

Solution to Problem

A wireless communications apparatus according to an aspect of the present invention performs wireless communications with an external apparatus. More specifically, the wireless communications apparatus includes: an antenna having a directivity that is changeable; a storage unit which store a plurality of directional patterns and a plurality of thresholds, the directional patterns each indicating the directivity of the antenna, and the thresholds each being an expected value of a throughput obtained according to a first radio propagation environment parameter indicating a state of a radio propagation environment; and a controller which changes the directivity of the antenna based on a directional pattern selected from the directional patterns. The controller includes: a threshold identifying unit which measures the first radio propagation environment parameter by using one of the directional patterns, and identify, from among the thresholds stored in the storage unit, a threshold corresponding to the measured first radio propagation environment parameter; a directional pattern selecting unit which: performs test communications by sequentially switching the directional patterns; measures a second radio propagation environment parameter for each of the directional patterns used for the test communications, the second radio propagation environment parameter being different from the first radio propagation environment parameter; and select, from among the directional patterns, a directional pattern having an actual throughput that is greater than the threshold, the actual throughput being calculated from a measurement value of the second radio propagation environment parameter; and a threshold adjusting unit which changes the threshold identified by the threshold identifying unit, according to the number of test communications that is the number of the directional patterns used for the test communications performed by the directional pattern selecting unit.

According to the configuration, information at the time of selecting the antenna directivity is learned for adjustment of the threshold, so that the threshold is used when the antenna directivity is selected next time. As a result, it is possible to control a variable-directivity antenna adapted to the installation environment of the wireless communications apparatus and a destination terminal.

As an implementation, it may be that the threshold adjusting unit decreases the threshold when the number of test communications is equal to or greater than a first value, and increases the threshold when the number of test communications is equal to or smaller than a second value.

It may also be that the directional pattern selecting unit stores, into the storage unit, (i) a measurement value of the first radio propagation environment parameter measured by the threshold identifying unit and (ii) the number of test communications performed before the directional pattern is selected, the measurement value and the number of test communications being stored as a test result in association with each other each time the directional pattern is selected. It may also be that the threshold adjusting unit changes the threshold when the test result stored in the storage unit matches a predetermined criterion. Accordingly, it is possible to prevent the threshold from varying due to the sudden and temporal change in the radio propagation environment.

As an implementation, it may be that the threshold adjusting unit determines that a plurality of the test results match the predetermined criterion when the number of test communications is consecutively equal to or smaller than a predetermined value, and increases the threshold, the plurality of the test results having the same measurement value of the first radio propagation environment parameter.

It may also be that when the throughput of each of the directional patterns is equal to or smaller than the threshold, the directional pattern selecting unit selects, from among the directional patterns, a directional pattern which provides a highest throughput. Accordingly, it is possible to select the directional pattern that is most suitable for the current radio propagation environment.

It may also be that the first radio propagation environment parameter is a received signal strength indicator of the antenna. The RSSI is a parameter that is relatively difficult to change because of the differences of the directional patterns; and thus, the RSSI is suitable for a first radio propagation environment parameter.

It may also be that the threshold identifying unit measures the received signal strength indicator of the antenna by using a directional pattern having a lowest directivity among the directional patterns. Accordingly, it is possible to further eliminate the variations in the measured RSSI caused due to the differences of the directional patterns.

It may also be that the second radio propagation environment parameter is a packet error rate of a packet received by the antenna. The packet error rate greatly varies depending on the differences of the directional patterns; and thus, the packet error rate is suitable for a second radio propagation environment parameter.

It may also be that the directional pattern selecting unit calculates the packet error rate based on a signal power to noise power (S/N) ratio of the antenna and a transmission rate of the wireless communications. The packet error rate may be calculated by the above method, or may also be obtained by directly counting the total number of received packets and the number of error packets out of the total.

It may also be that the controller always monitors a change in the radio propagation environment, and starts selecting the directional pattern when a range of the change in the radio propagation environment exceeds a predetermined acceptable range.

For example, in the case where an obstacle appears or disappears between terminals, the radio propagation environment greatly changes.

It may also be that the threshold adjusting unit halts changing the threshold for a predetermined period when the threshold is alternately increased and decreased for a predetermined number of times. Accordingly, the processing speed of the wireless communications apparatus increases.

Furthermore, it may be that the wireless communications apparatus further includes: a plurality of the antennas, and in which the directional pattern indicates a combination of directivities of the antennas. Accordingly, it is possible to achieve a wireless communications apparatus which is capable of appropriately adapting to various changes in the radio propagation environment.

A wireless communications method according to an aspect of the present invention is a method of performing wireless communications with an external apparatus, the method being performed by a wireless communications apparatus which includes an antenna and a storage unit, the antenna having a directivity that is changeable, the storage unit storing a plurality of directional patterns and a plurality of thresholds, the directional patterns each indicating the directivity of the antenna, the thresholds each being an expected value of a throughput obtained according to a first radio propagation environment parameter indicating a state of a radio propagation environment. More specifically, the method includes: measuring the first radio propagation environment parameter by using one of the directional patterns, and identifying, from among the thresholds stored in the storage unit, a threshold corresponding to the measured first radio propagation environment parameter; (i) performing test communications by sequentially switching the directional patterns, (ii) measuring a second radio propagation environment parameter for each of the directional patterns used for the test communications, the second radio propagation environment parameter being different from the first radio propagation environment parameter, (iii) selecting, from among the directional patterns, a directional pattern having an actual throughput that is greater than the threshold, the actual throughput being calculated from a measurement value of the second radio propagation environment parameter, and (iv) causing the antenna to perform the wireless communications with the selected directional pattern; and changing the threshold identified in the identifying, according to the number of test communications that is the number of the directional patterns used for the test communications performed in the performing.

A non-transitory computer-readable recording medium according to an aspect of the present invention is a non-transitory computer-readable recording medium for use in a computer and having a computer program recorded thereon, the computer including an antenna and a storage unit, the antenna having a directivity that is changeable, the storage unit storing a plurality of directional patterns and a plurality of thresholds, the directional patterns each indicating the directivity of the antenna, and the thresholds each being an expected value of a throughput obtained according to a first radio propagation environment parameter indicating a state of a radio propagation environment. More specifically, the computer program causing the computer to perform wireless communications with an external apparatus and causing the computer to execute: measuring the first radio propagation environment parameter by using one of the directional patterns, and identifying, from among the thresholds stored in the storage unit, a threshold corresponding to the measured first radio propagation environment parameter; (i) performing test communications by sequentially switching the directional patterns, (ii) measuring a second radio propagation environment parameter for each of the directional patterns used for the test communications, the second radio propagation environment parameter being different from the first radio propagation environment parameter, (iii) selecting, from among the directional patterns, a directional pattern having an actual throughput that is greater than the threshold, the actual throughput being calculated from a measurement value of the second radio propagation environment parameter, and (iv) causing the antenna to perform the wireless communications with the selected directional pattern; and changing the threshold identified in the identifying, according to the number of test communications that is the number of the directional patterns used for the test communications performed in the performing.

An integrated circuit according to an aspect of the present invention is an integrated circuit which causes a wireless communications apparatus to perform wireless communications with an external apparatus, the wireless communications apparatus including an antenna and a storage unit, the antenna having a directivity that is changeable, the storage unit storing a plurality of directional patterns and a plurality of thresholds, the directional patterns each indicating the directivity of the antenna, and the thresholds each being an expected value of a throughput obtained according to a first radio propagation environment parameter indicating a state of a radio propagation environment. More specifically, the integrated circuit includes: a threshold identifying unit measures the first radio propagation environment parameter by using one of the directional patterns, and identify, from among the thresholds stored in the storage unit, a threshold corresponding to the measured first radio propagation environment parameter; a directional pattern selecting unit: performs test communications by sequentially switching the directional patterns; measure a second radio propagation environment parameter for each of the directional patterns used for the test communications, the second radio propagation environment parameter being different from the first radio propagation environment parameter; and selects, from among the directional patterns, a directional pattern having an actual throughput that is greater than the threshold, the actual throughput being calculated from a measurement value of the second radio propagation environment parameter; and a threshold adjusting unit configured to change the threshold identified by the threshold identifying unit, according to the number of test communications that is the number of the directional patterns used for the test communication performed by the directional pattern selecting unit.

The present invention may be implemented not only as a wireless communications apparatus, but also as an integrated circuit which achieves the functions of the wireless communications apparatus, and as a program causing a computer to execute such functions. The program may be, of course, distributed via a recording medium such as a CD-ROM, and via a transmission medium such as the Internet.

Advantageous Effects of Invention

According to the present invention, it is possible to select an antenna directivity with a higher communications performance, and also to reduce the time required for selecting the antenna directivity. As a result, it is possible to enhance the tracking of the antenna directivity to the changes in the radio propagation environment. Furthermore, information obtained when selecting the antenna directivity is learned for adjustment of the threshold, so that the threshold can be used when the antenna directivity is selected next time. As a result, it is possible to control a variable-directivity antenna adapted to the installation environment of the wireless communications apparatus and a destination terminal.

BRIEF DESCRIPTION OF DRAWINGS

FIG. 10 shows specific example 1 of states of previous antenna directivity selections according to Embodiment 2 of the present invention.

FIG. 11 shows specific example 2 of states of previous antenna directivity selections according to Embodiment 2 of the present invention.

DESCRIPTION OF EMBODIMENTS

Embodiment 1

Figure 1:
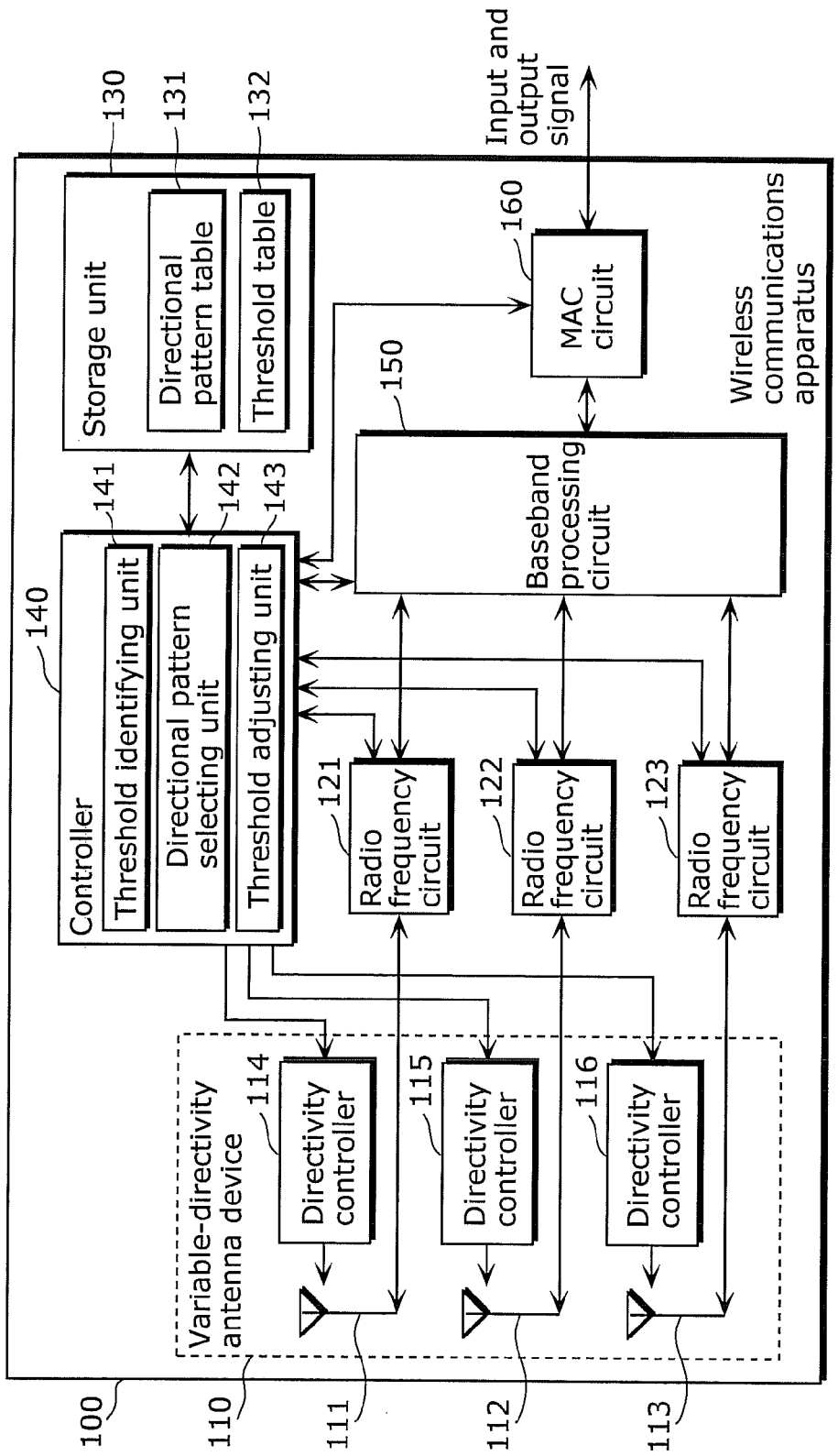
FIG. 1 is a configuration diagram of a wireless communications apparatus according to Embodiment 1 of the present invention.

FIG. 1 is a configuration diagram of a wireless communications apparatus 100 according to Embodiment 1 of the present invention. The wireless communications apparatus 100 mainly includes a variable-directivity antenna device 110; radio frequency circuits 121, 122, and 123; a storage unit 130; a controller 140; a baseband processing circuit 150; and a media access control (MAC) circuit 160.

The variable-directivity antenna device 110 includes: variable directivity antenna elements (hereinafter, referred to as antenna) 111, 112, and 113; and directivity controllers 114, 115, and 116 which respectively controls the directivities of the antennas 111, 112, and 113. FIG. 1 shows an example where three antennas 111, 112, and 113 are included, but the present invention is not limited to this example. More specifically, only the antenna 111 may be included, or more antennas may be included. The directivity controllers 114, 115, 116 are provided in one-to-one correspondence with the antennas 111, 112, and 113.

The radio frequency circuits 121, 122, and 123 respectively converts the radio frequency signals received by the antennas 111, 112, and 113 into baseband signals, and outputs the baseband signals to the baseband processing circuit 150. The radio frequency circuits 121, 122, and 123 also convert baseband signals received from the baseband processing circuit 150 into radio frequency signals and transmit the radio frequency signals through the antennas 111, 112, and 113. The radio frequency circuits 121, 122, and 123 are provided in one-to-one correspondence with the antennas 111, 112, and 113.

The storage unit 130 includes a directional pattern table 131, a threshold table 132, and other control information or the like. For the storage unit 130, a read only memory (ROM), a random access memory (RAM), a hard disk drive (HDD), or any other kinds of storage units may be used.

Figure 2:
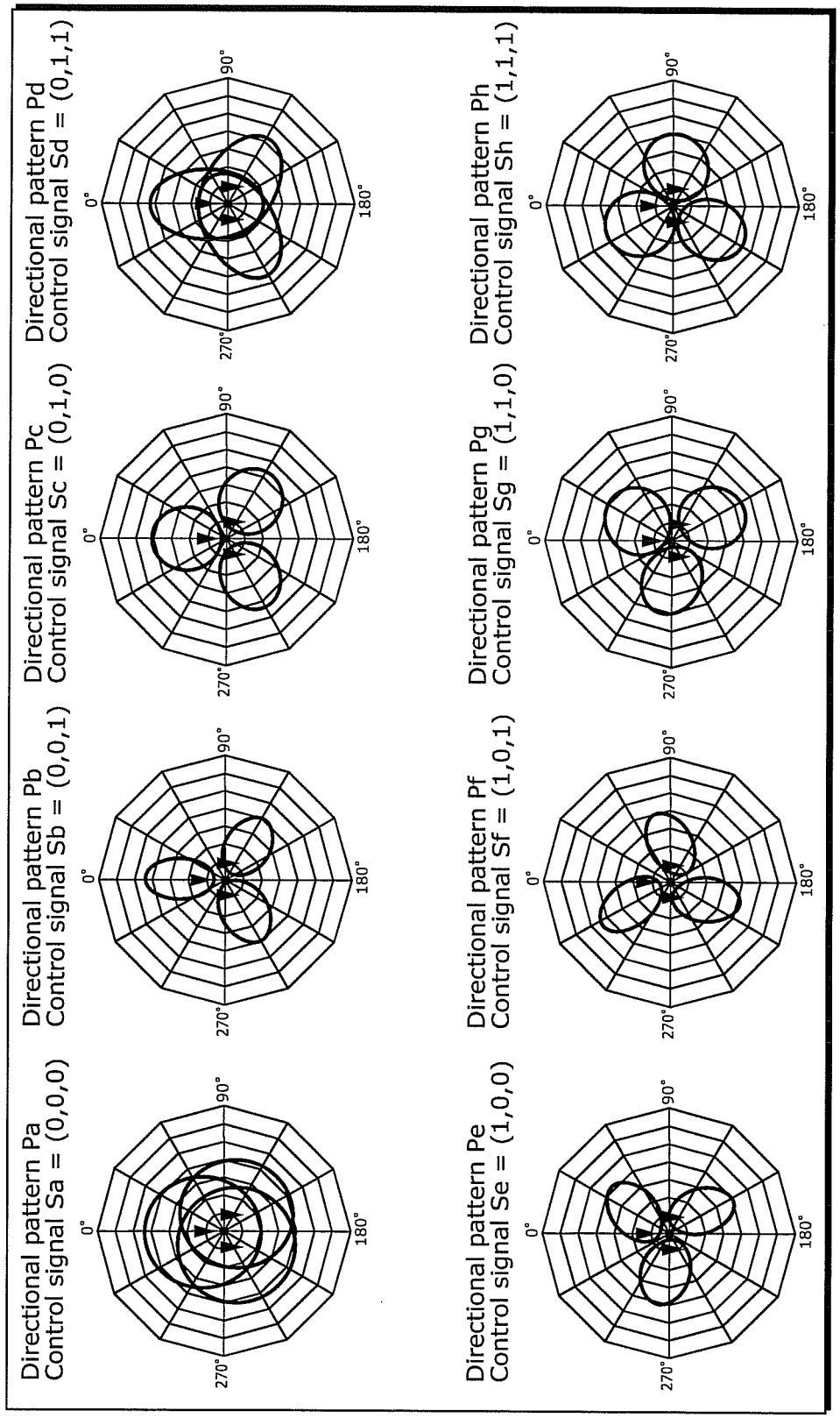
FIG. 2 is a diagram illustrating possible synthesized directivities of a variable-directivity antenna device according to Embodiment 1 of the present invention.

As shown in FIG. 2, the directional pattern table 131 holds plural kinds (eight kinds) of directional patterns Pa to Ph each indicating a combination of the directivities of the antennas 111, 112, and 113. In practice, the directional pattern table 131 stores not the directivities themselves, but data on control signals Sa to Sh output to the respective directivity controllers 114, 115, and 116 for achieving the directivities Pa to Ph shown in FIG. 2.

Furthermore, the directional patterns Pa to Ph shown in FIG. 2 represent the synthesized directivities in which the directivities formed by the respective antennas 111, 112, and 113 are synthesized. It may also be that the directional pattern table 131 stores the directivity of each antenna 111, 112, and 113 so that the controller 140 separately selects the directivity of each antenna 111, 112, and 113.

Figure 4:
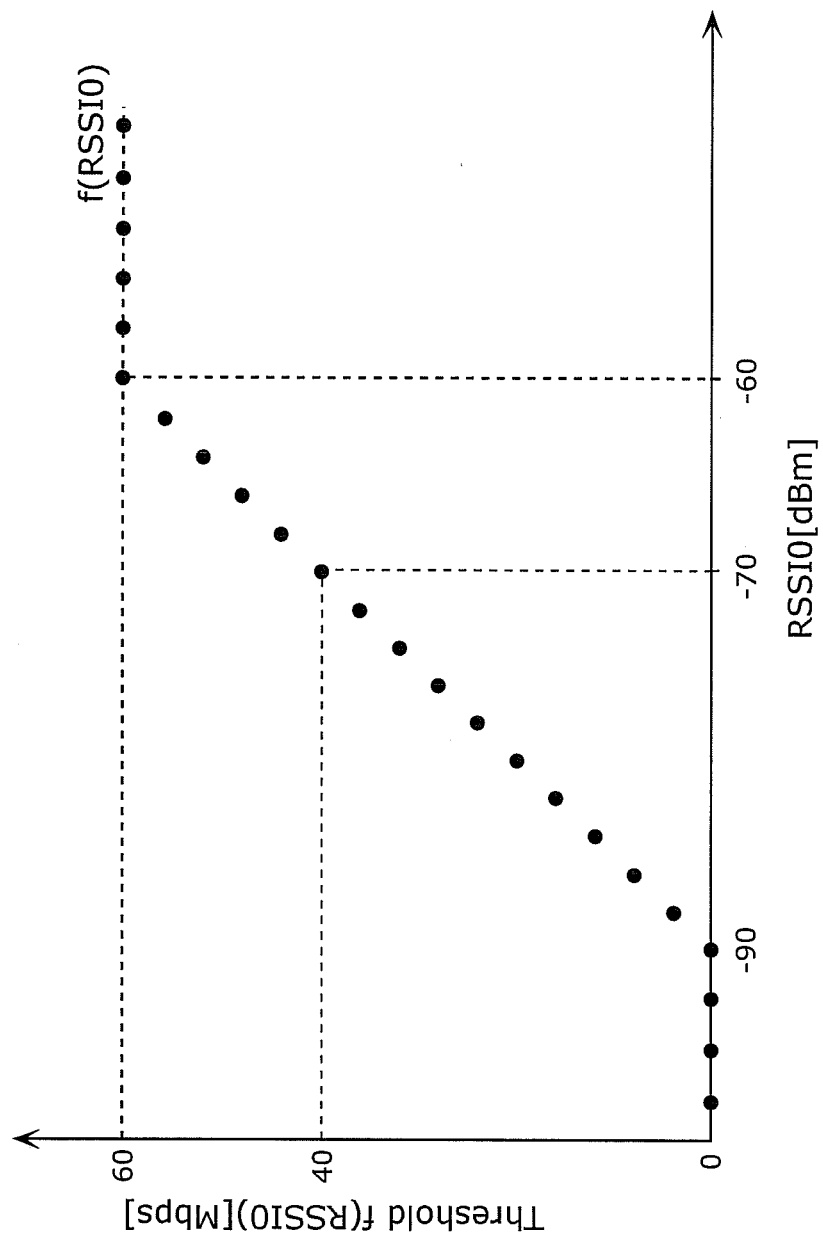
FIG. 4 shows an initial value of a function f for obtaining a threshold according to Embodiment 1 of the present invention.

The threshold table 132 stores thresholds that are expected values of throughput (which typically indicates transmission rate, and the same applies in the following description) of the wireless communications apparatus 100. FIG. 4 shows an example of the threshold table 132 according to Embodiment 1. The threshold table 132 shown in FIG. 4 holds thresholds corresponding to the RSSI (first radio propagation environment parameters) of the antennas 111, 112, and 113. In practice, the threshold table 132 stores a function f (RSSI0) which defines the relationship shown in FIG. 4.

The controller 140 selects a directional pattern stored in the directional pattern table 131, based on the information obtained from the radio frequency circuits 121, 122, and 123, the baseband processing circuit 150, the MAC circuit 160 or the like, and notifies the directivity controllers 114, 115, and 116 of the selected directional pattern. More specifically, the controller 140 includes a threshold identifying unit 141, a directional pattern selecting unit 142, and a threshold adjusting unit 143.

The threshold identifying unit 141 measures the RSSI of the antennas 111, 112, and 113. The threshold identifying unit 141 then identifies the threshold corresponding to the measurement result, with reference to FIG. 4. Here, the directional pattern set to the antennas 111, 112, and 113 is not particularly limited. For example, the RSSI may be measured by using the directional pattern Pa that has a lowest directivity.

The directional pattern selecting unit 142 performs test communications by sequentially switching the directional patterns Pa to Ph, and measures packet error rate (PER) in each of the directional patterns used for the test communications. Next, an actual throughput is calculated from the measured PER. When the calculated throughput is greater than the threshold identified by the threshold identifying unit 141, the directional pattern selecting unit 142 selects the corresponding directional pattern.

The threshold adjusting unit 143 changes the threshold identified by the threshold identifying unit 141, according to the number of test communications that is the number of directional patterns used for the test communications performed by the directional pattern selecting unit 142. More specifically, the threshold adjusting unit 143 decreases the threshold when the number of test communications is eight times (first value), and increases the threshold when the number of test communications is once (second value).

The baseband processing circuit 150, for example, calculates the PER, or signal power to noise power ratio (SNR) of the antennas 111, 112, and 113, and notifies the controller 140 of the calculated PER or the SNR. The MAC circuit 160, for example, notifies the controller of the transmission rate included in the header part of a received packet.

Figure 3:
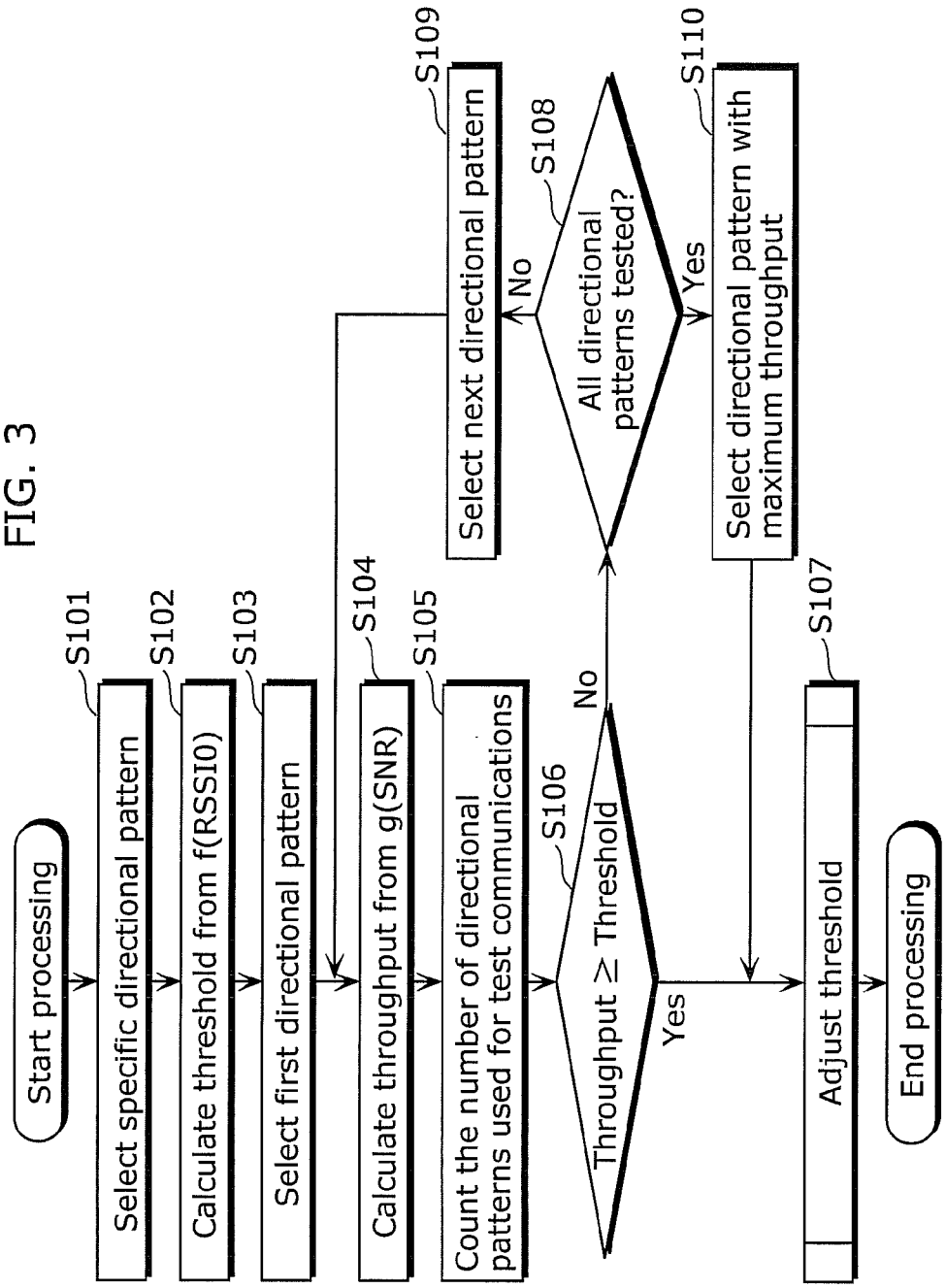
FIG. 3 is a flowchart of a method of selecting an antenna directivity according to Embodiment 1 of the present invention.

FIG. 3 is a flowchart of the operations of the wireless communications apparatus 100 according to Embodiment 1 of the present invention. With reference to the flowchart, description is given to a method of selecting an antenna directivity according to Embodiment 1.

First, the controller 140 determines whether or not there are any changes in the radio propagation environment, based on a parameter related to the radio propagation environment or communications performance provided from the radio frequency circuits 121, 122, and 123, the baseband processing circuit 150, and the MAC circuit 160. The controller 140 starts a new processing for selecting an antenna directivity when it is determined that there is a change in the radio propagation environment which requires the switching of antenna directivity.

As an example, the controller 140 always monitors the RSSI of the antennas 111, 112, and 113. The controller 140 starts the processing shown in FIG. 3 when at least one of the antennas 111, 112, and 113 has the RSSI which varies in a range greater than a predetermined acceptable range. Alternatively, the controller 140 may start the processing shown in FIG. 3 when the transmission rate included in the header of the received packet is changed.

Next, the threshold identifying unit 141 selects a directional pattern used for measuring the RSSI from among the directional patterns Pa to Ph shown in FIG. 2. For example, the threshold identifying unit 141 selects the directional pattern Pa having a lowest directivity. The threshold identifying unit 141 then reads the control signal Sa which indicates the directional pattern Pa, from the directional pattern table 131 shown in FIG. 2, and notifies the directivity controllers 114, 115, and 116 of the read control signal Sa (S101).

Subsequently, the threshold identifying unit 141 obtains a first radio propagation environment parameter that can be measured when receiving a packet from the radio frequency circuits 121, 122, and 123, the baseband processing circuit 150, and the MAC circuit 160. In Embodiment 1, the first radio propagation environment parameter is selected from RSSI1, RSSI2, and RSSI3 that are RSSI respectively measured by the three antennas 111, 112, and 113 (hereinafter, the one selected here is referred to as RSSI0).

The threshold identifying unit 141 inputs the obtained RSSI0 to the function f to obtain the function output f (RSSI0) as a threshold of the communications performance (S102). Here, the best directional pattern can be selected faster in the case where the threshold corresponds to the communications performance obtained when the best directional pattern is selected from among all of the possible directional patterns Pa to Ph in the current radio propagation environment. However, the controller 140 does not have information on the radio propagation environment where the wireless communications apparatus 100 is placed or on a wireless communications apparatus that is a communications partner. Thus, the controller 140 has, as an initial value, the function f for obtaining the threshold shown in FIG. 4. According to FIG. 4, when the RSSI0 is −70 dBm, the threshold identifying unit 141 obtains 40 Mbps as a threshold.

Next, the directional pattern selecting unit 142 selects, from the directional pattern table 131, the directional pattern used for the first test communications. Here, the directional pattern for the first test communications may be any one of the candidates for the optimal directional patterns. In Embodiment 1, all of the directional patterns in the directional pattern table 131 are assumed to be the candidates, and the directional pattern Pe is selected as the directional pattern for the first test communications.

The directional pattern selecting unit 142 reads the control signal Se from the directional pattern table 131 and outputs the control signal Se to the directivity controllers 114, 115, and 116, so as to implement the directional pattern Pe. Upon receipt of the control signal Se, the directivity controllers 114, 115, and 116 control the antennas 111, 112, and 113 to implement the directional pattern Pe (S103).

Subsequently, the wireless communications apparatus 100 transmits and receives packets to and from a wireless communications terminal that is a communications partner. The directional pattern selecting unit 142 then obtains a second radio propagation environment parameter measured when receiving a packet from the radio frequency circuits 121, 122, and 123, the baseband processing circuit 150, and the MAC circuit 160.

The second radio propagation environment parameter is, for example, the PER of received packets. The PER may be calculated by counting the total number of packets received per unit time and the number of error packets among the total, and using the equation of (PER)=(the number of error packets)/(the total number of packets).

It may also be that the SNR of the respective antennas 111, 112, and 113 is measured to calculate the PER based on the measurement result of the SNR and the transmission rate included in the header part of the received packet.

The directional pattern selecting unit 142 inputs the obtained PER into the function g, and obtains the function output g (PER) as the actual communications performance (here, actual throughput) obtained when communications is performed with the directivity Pe (S104). More specifically, the throughput can be calculated by multiplying the transmission rate by a complement of the PER (1-PER).

Here, the directional pattern selecting unit 142 counts the number of test communications, that is, the number of the directional patterns used for the test communications (S105). The number of the test communications is a value which is reset (=0) when the processing shown in FIG. 3 starts, and which increases by one at a time in Step S105.

The directional pattern selecting unit 142 compares the actual throughput with the threshold identified by the threshold identifying unit 141 (S106). The directional pattern selecting unit 142 determines that the directional pattern Pe provides the best communications performance in the current radio propagation environment, when the actual throughput is equal to or greater than the threshold that is 40 Mbps (Yes in S106). The directional pattern Pe is then selected as a desired directional pattern, and subsequent communications is continued while maintaining the directional pattern Pe. Then, the processing proceeds to the threshold adjustment processing S107. Details of the threshold adjustment processing S107 are described later.

On the other hand, when the actual throughput is less than the threshold that is 40 Mbps (No in S106), the directional pattern selecting unit 142 determines that the directional pattern Pe does not provide the best communications performance in the current radio propagation environment, and continues the directional pattern selection processing.

In the case where the directional pattern selection processing continues, the directional pattern selecting unit 142 determines whether or not all of the directional patterns Pa to Ph extracted as candidates have been used for the test communications (S108). When there are any directional patterns that have not been used yet for the test communications (No in S108), the directional pattern selecting unit 142 selects the next directional pattern.

For example, the directional pattern selecting unit 142 reads the control signal Sf from the directional pattern table 131, and outputs the control signal Sf to the directivity controllers 114, 115, and 116 for implementing the directional pattern Pf. Upon receipt of the control signal Sf, the directivity controllers 114, 115, and 116 control the antennas 111, 112, and 113 for implementing the directional pattern Pf (S109). After that, the directional pattern selecting unit 142 repeats the processing of S104 to S106.

On the other hand, when all of the directional patterns Pa to Ph extracted as candidates have been used for the test communications (Yes in S108), the directional pattern selecting unit 142 compares the actual throughputs obtained from all of the directional patterns Pa to Ph used for the test communications, and determines, as an optimal directional pattern, the directional pattern with the maximum throughput.

The directional pattern selecting unit 142 then reads the corresponding control signal from the directional pattern table 131 and outputs the control signal to the directivity controllers 114, 115, and 116 for implementing the directional pattern. Upon receipt of the control signal, the directivity controllers 114, 115, and 116 control the antennas 111, 112, and 113 for implementing the directional pattern with the maximum throughput (S110). Then, the processing proceeds to the threshold adjustment processing S107.

Figure 5:
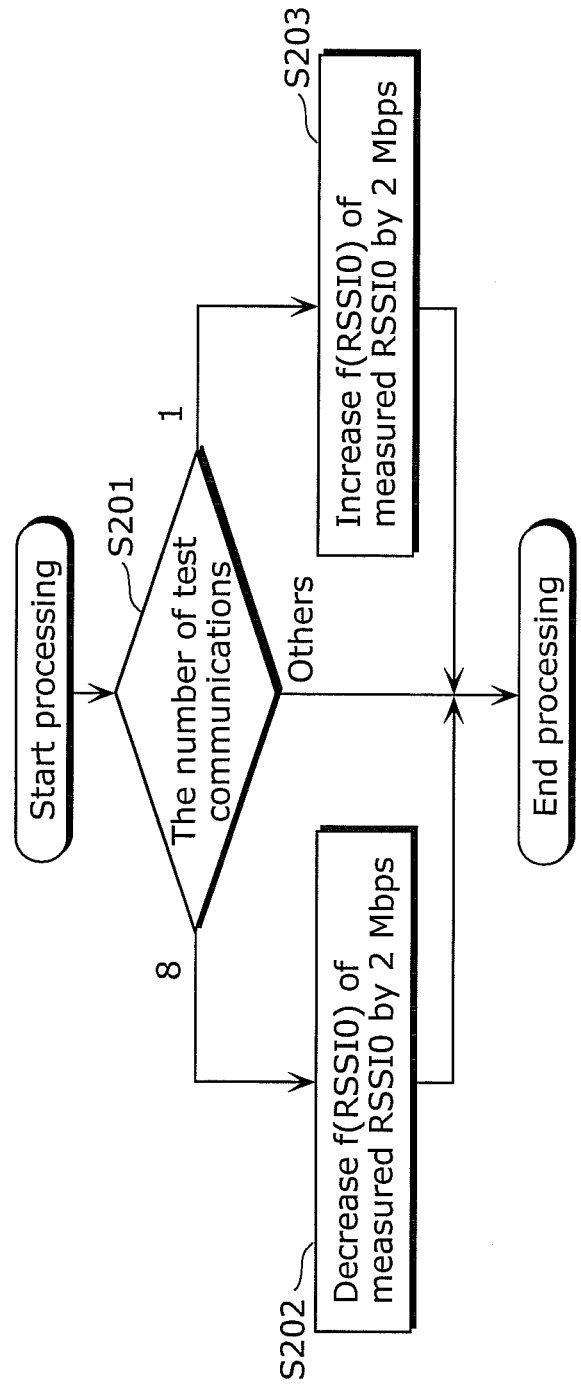
FIG. 5 is a flowchart of threshold adjustment processing according to Embodiment 1 of the present invention.

FIG. 5 is a flowchart of the details of the threshold adjustment processing S107 shown in FIG. 3. First, the threshold adjusting unit 143 determines the number of test communications counted in S102 (S201).

When the number of test communications is eight (first value) ("8" in S201), the threshold adjusting unit 143 determines that the selection has not been made even after the test communications with all of the eight directional patterns because the threshold value is greater than the actual best communications performance. The threshold adjusting unit 143 then adjusts the threshold f (RSSI0) identified by the threshold identifying unit 141, that is, the threshold (=40 Mbps) which corresponds to the measured RSSI0 (=−70 dBm). In Embodiment 1, the threshold is decreased only by a certain amount (2 Mbps) (S202).

Figure 6:
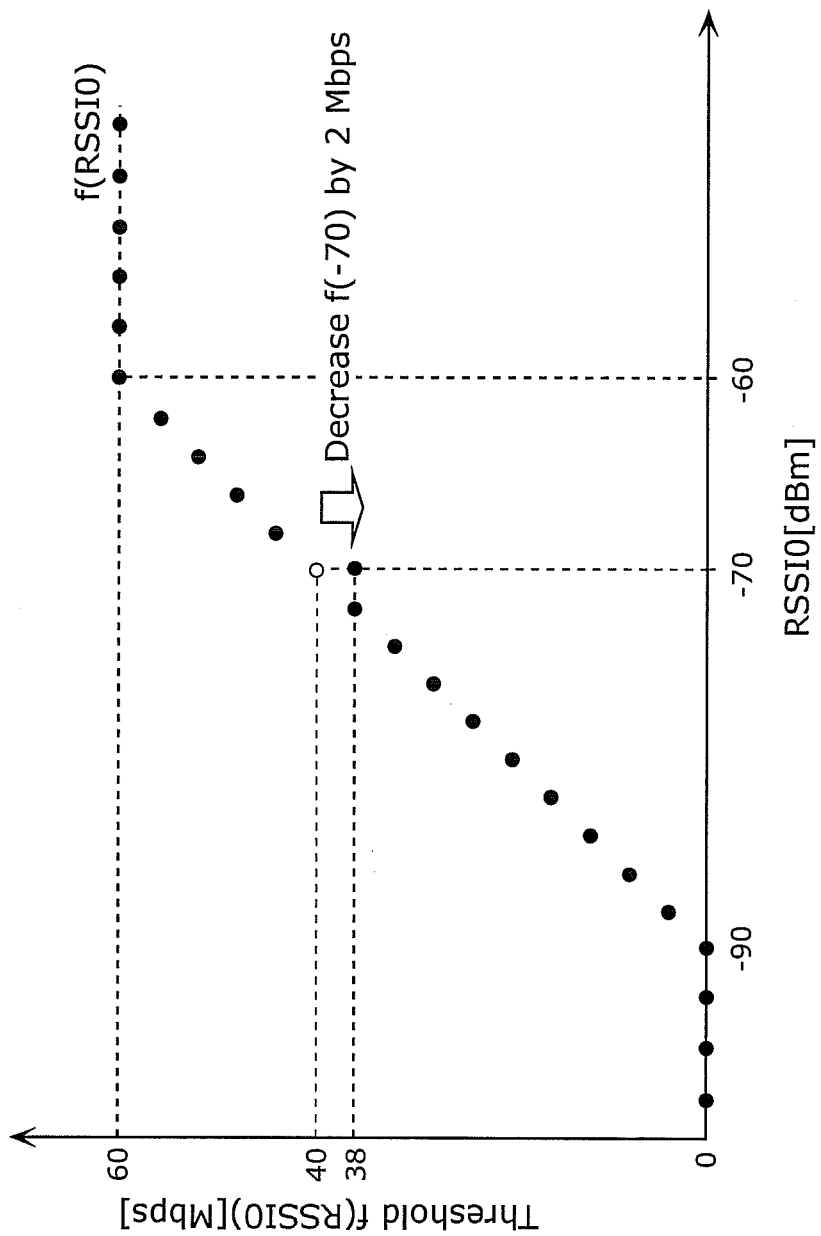
FIG. 6 shows specific example 1 of the threshold adjustment according to Embodiment 1 of the present invention.
Figure 7:
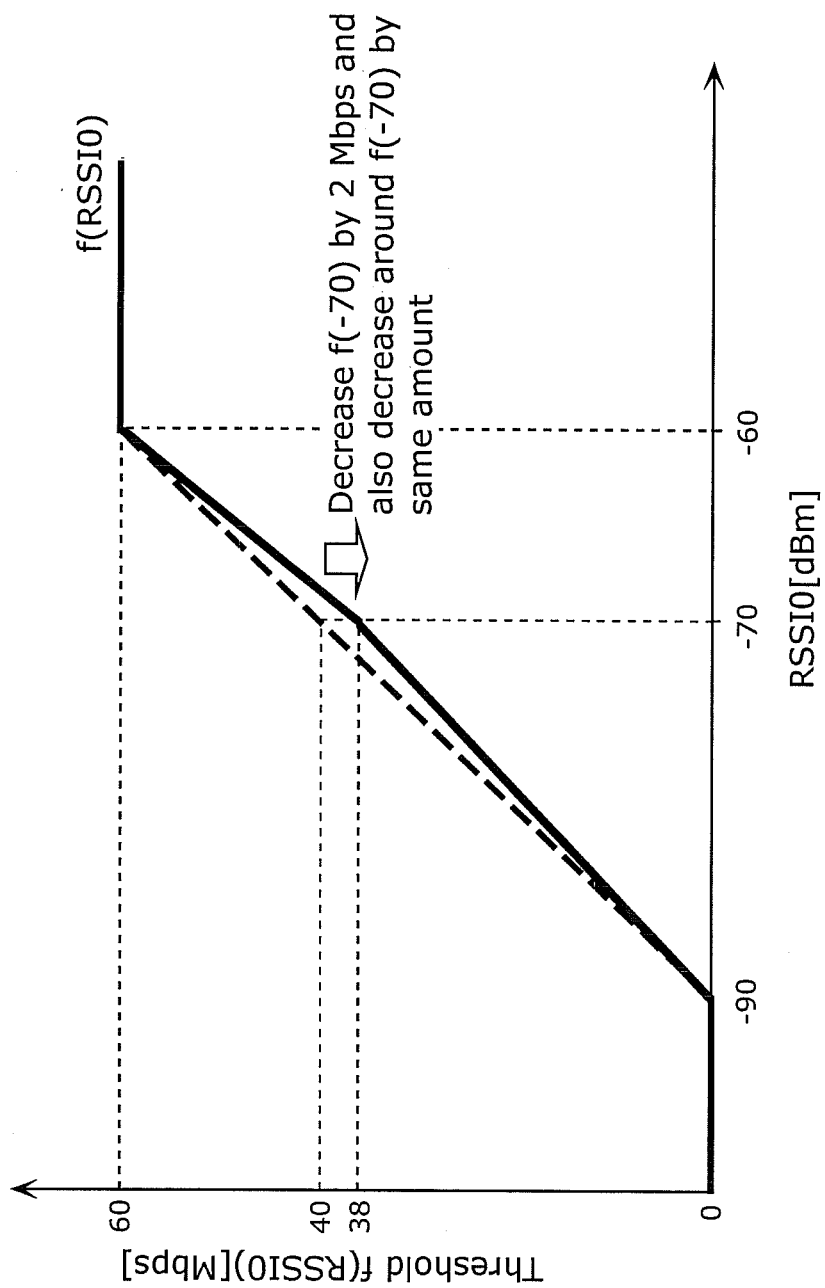
FIG. 7 shows specific example 2 of the threshold adjustment according to Embodiment 1 of the present invention.
Figure 8:
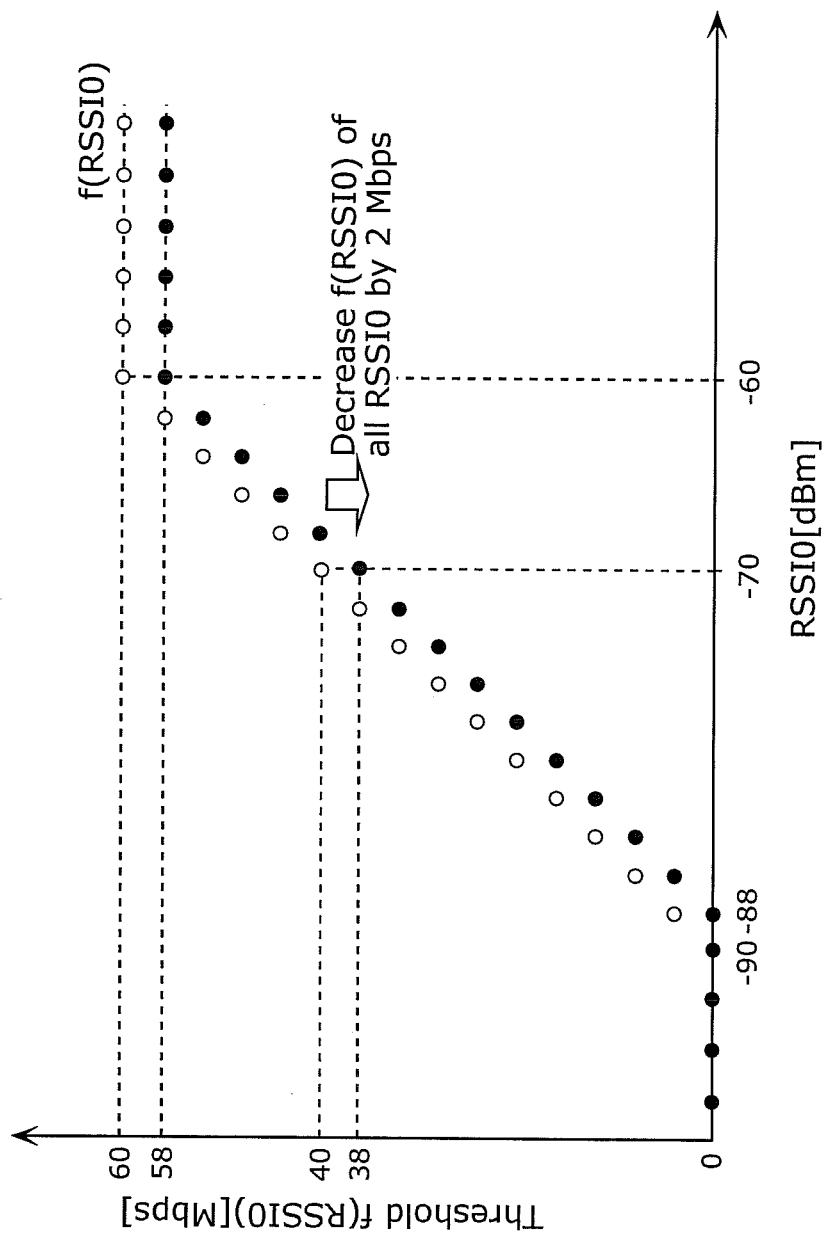
FIG. 8 shows specific example 3 of the threshold adjustment according to Embodiment 1 of the present invention.

FIG. 6 to FIG. 8 show the specific examples where the value of the function f (RSSI0) for obtaining the threshold shown in FIG. 4 is decreased. As a result of the processing in S202, the threshold adjusting unit 143 decreases f (−70) from 40 Mbps to 38 Mbps. Here, as shown in FIG. 6, it may be that only f (−70) in FIG. 4 is decreased by 2 Mbps. As shown in FIG. 7, it may also be that assuming that the function f (RSSI0) shown in FIG. 4 is a continuous function indicated by the dashed line, f (−70) is decreased by 2 Mbps, and the values of the function f (RSSI0) around the f (−70) are also decreased so that the continuous function is formed even after the decrease. Furthermore, as shown in FIG. 8, not only the f (−70), but also the overall function f (RSSI0) may be decreased by 2 Mbps. Of course, other adjustment methods of the function f (RSSI0) are also possible.

When the number of test communications is one (second value) ("1" in S201), the threshold adjusting unit 143 determines that the test communications have been completed early because the threshold value is lower than the actual best communications performance. The threshold adjusting unit 143 then increases the threshold f (RSSI0) identified by the threshold identifying unit 141 by a certain amount, for example, by 2 Mbps (S203).

When the number of test communications is from two to seven (others in S201), the threshold adjusting unit 143 ends the processing without changing the value of the threshold f (RSSI0) identified by the threshold identifying unit 141. When the threshold adjustment processing S107 by the above method ends, the controller 140 ends the directional pattern selection processing. The function f (RSSI0) for obtaining the threshold adjusted by the above method is used for the subsequent directional pattern selection processing.

In the configuration shown in FIG. 1, the directivity controllers 114, 115, and 116, the controller 140, and the directional pattern table 131 each may be implemented by hardware or software. The method for changing the directivity of the antennas 111, 112, and 113 is not limited. In addition, in the example above, when the wireless communications apparatus 100 performs a plurality of communications apparatuses that are communications partners, it is, of course, possible to have a function for obtaining the threshold for each communications partner.

According to the method described above, it is possible to select the directional pattern with higher communications performance. It is also possible to reduce the time required for selecting the directional pattern. As a result, it is possible to enhance the tracking of the antenna directivity to the changes in the radio propagation environment.

Furthermore, by repeatedly learning information obtained when selecting the directional pattern to adjust the threshold, the threshold becomes closer to the communications performance obtained when the best antenna directivity is selected from among all possible antenna directivities in the current radio propagation environment. As a result, it is possible to control the antennas 111, 112, and 113 according to the installation environment of the wireless communications apparatus 100 and the destination terminals. More specifically, the wireless communications apparatus 100, which selects the directional pattern by using the method according to the present invention, is capable of stably transmitting data.

In Embodiment 1, the increase and decrease ranges of the threshold are constant; however, the ranges are not limited. For example, the threshold may be constantly increased or decreased by a certain ratio (for example, the threshold is increased or decreased by the value corresponds to 3% of the current threshold). The increase or decrease range may be variable depending on the conditions.

It may also be that the threshold adjustment processing (S107 in FIG. 3) is halted for a predetermined period under a certain condition. For example, the threshold adjustment processing may be halted when the threshold is alternately increased and decreased for a predetermined number of times.

Embodiment 2

Embodiment 2 is a variation of the threshold adjustment processing according to Embodiment 1. Embodiment 2 differs from Embodiment 1 in that for each selection of a directional pattern, the measurement value of RSSI0 and the number of test communications are stored in association with each other, and the threshold adjustment is performed according to the stored result.

First, prior to the threshold adjustment processing, the directional pattern selecting unit 142 stores, into the storage unit 130, RSSI0 measured by the threshold identifying unit 141 and the number of test communications counted in S105 of FIG. 3. The directional pattern selecting unit 142 stores them in association with each other as the test communications results. Although not illustrated in the drawings, a table for storing the test results is referred to as a test result table.

FIG. 10 and FIG. 11 show specific examples of the test result table stored in the storage unit 130. As shown in FIG. 10, each time the directional pattern selection processing (processing shown in FIG. 3) is performed, the measurement value of the RSSI0 and the number of test communications are stored in association with each other in chronological order.

Figure 9:
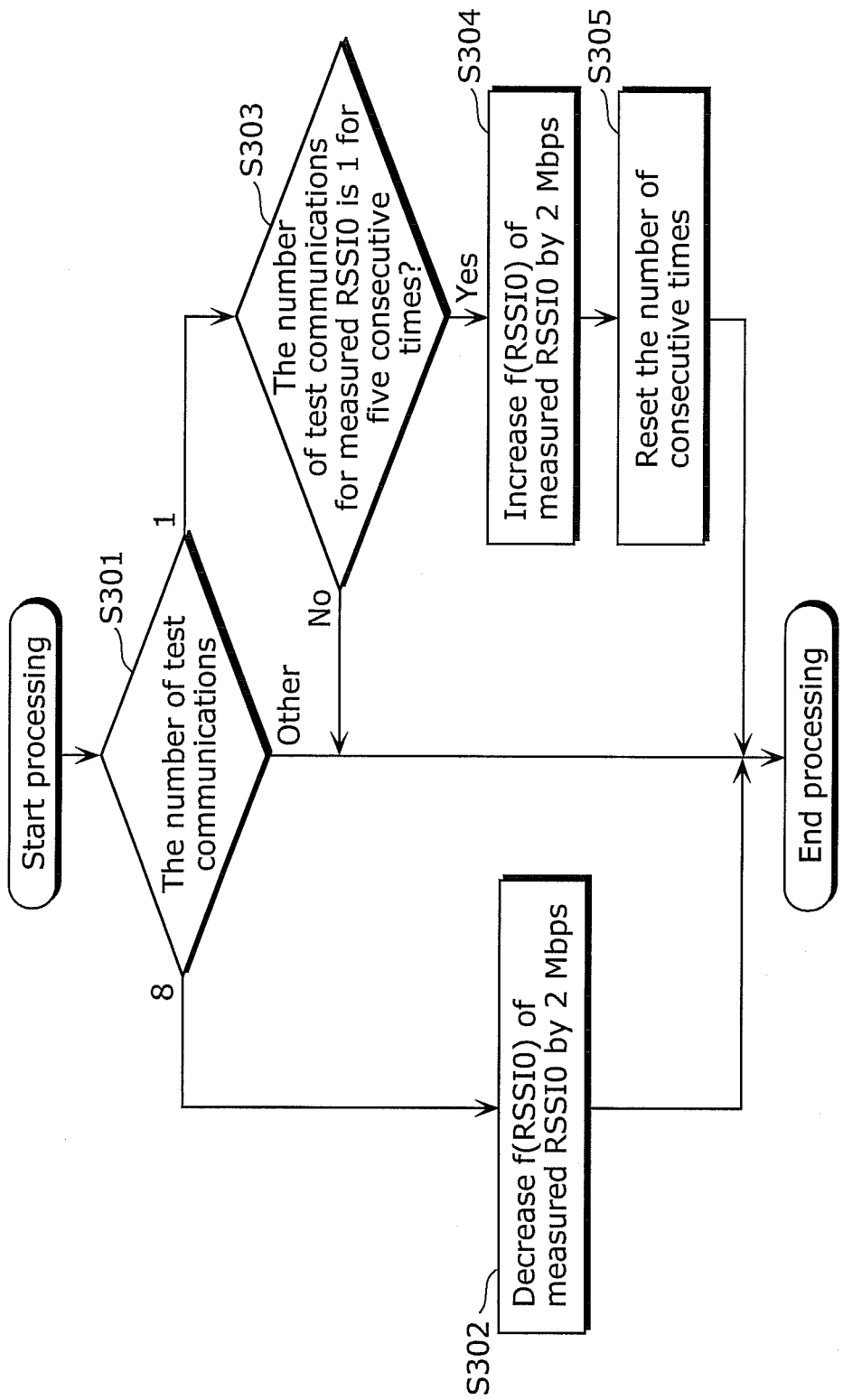
FIG. 9 is a flowchart of threshold adjustment processing according to Embodiment 2 of the present invention.
Figure 12:
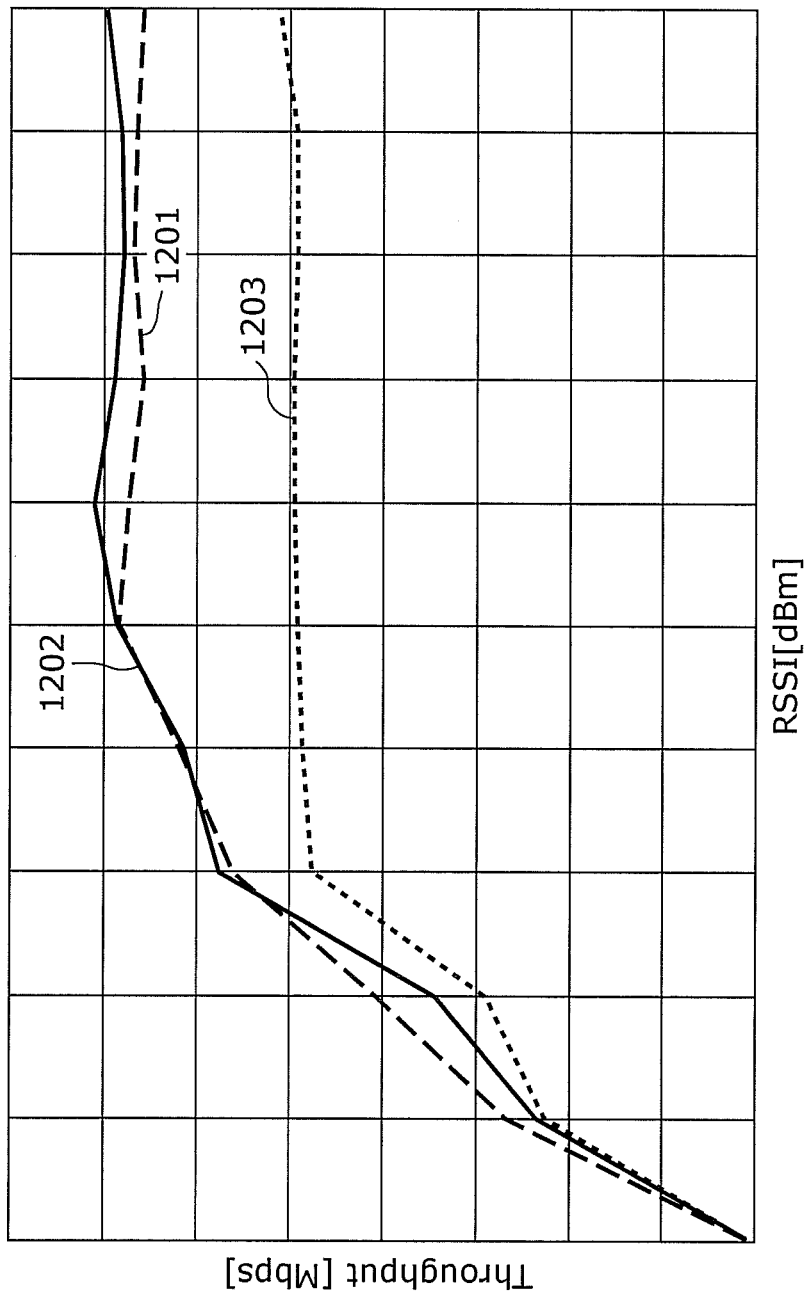
FIG. 12 is a graph plotting a relationship between RSSI and throughput measured between wireless communications apparatuses.

Next, FIG. 9 is a flowchart of the details of threshold adjustment processing (S107 in FIG. 3) according to Embodiment 2.

The threshold adjusting unit 143 determines the number of test communications counted in S105 (S301). The processing performed when the number of test communications is eight or two to seven ("8" or "others" in S301) is the same as that in FIG. 5; and thus, its description is omitted.

When the number of test communications is one ("1" in S301), the threshold adjusting unit 143 determines, based on the test result table, the previous number of test communications for the value of the RSSI0 measured by the threshold identifying unit 141 (for example, here, the value of the RSSI0 is −70 dBm which is the same in Embodiment 1) (S303). More specifically, the threshold adjusting unit 143 determines how many times the test result of "the number of test communications is 1" is repeated in a row when the RSSI0 is −70 dBm.

For example, in the state of the previous directional pattern selections as shown in FIG. 10, the current consecutive number of times is two (No in S303). In this case, the threshold adjusting unit 143 does not adjust the threshold. On the other hand, in the state of the previous directional pattern selections as shown in FIG. 11, the threshold adjusting unit 143 increases the threshold f (−70) by 2 Mbps because the number of consecutive number of times reaches five (Yes in S303) (S304). Subsequently, the threshold adjusting unit 143 resets the number of consecutive times (rightmost column in FIG. 11) to 0 (S305), and ends the threshold adjustment processing.

According to the above structure, it is possible to adjust the threshold based on the changes in the radio propagation environment made during a certain amount of time. Accordingly, it is possible to prevent the threshold from varying due to the sudden and temporal changes in the radio propagation environment. As a result, a more appropriate threshold can be obtained.

In Embodiment 2, the example has been described where the test results are used only when the threshold is increased; however, of course, the threshold may also be decreased based on the test results. More specifically, in S302 of FIG. 9, the threshold may be decreased when the number of test communications is consecutively equal to or greater than a predetermined value (for example, 8) for the same test results of the RSSI0.

In the examples shown in FIG. 10 and FIG. 11, only the case where the RSSI0 is −70 dBm has been described; however, the same is applied to the other measurement values. Furthermore, the present invention is not limited to the example where how many times "the number of consecutive times is 1" is repeated in a row is added up for each measurement value of the RSSI0. The determination may be made based on not only the measurement result of the RSSI0, but also, for example, the test results of five consecutive times immediate before the current one.

The present invention may be implemented not only as a wireless communications apparatus, but also as an integrated circuit which achieves the functions of the wireless communications apparatus, and as a program causing a computer to execute the functions.

The method for circuit integration is not limited to Large Scale Integration (LSI), and implementation with a dedicated circuit or a generally-purpose processor is also available. It is also acceptable to use an FPGA (Field Programmable Gate Array) that is programmable after the LSI has been manufactured, or a reconfigurable processor in which connections and settings of circuit cells within the LSI are reconfigurable.

The program data may be installed into a storage device through a recoding medium, or may be directly executed from a recoding medium. The recoding medium is referred to, for example, a semiconductor memory such as a ROM, a RAM, and a flash memory; a magnetic disk memory such as a flexible disk and a hard disk; an optical disk such as a CD-ROM, a DVD, and a BD; and a memory card such as an SD card. In addition, the recording medium is a concept including a communications medium such as a phone line and a carrier route.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The wireless communications apparatus which includes the antenna directivity control method according to the present invention is capable of stably transmitting data at high speed by controlling antennas quickly tracking the changes in the radio propagation environment. The present invention is useful for appliances which transmit not only data such as conventional text or still images, but also real-time images or data such as movie or music streams.

REFERENCE SIGNS LIST

100 Wireless communications apparatus
110 Variable-directivity antenna device
111, 112, 113 Antenna
114, 115, 116 Directivity controller
121, 122, 123 Radio frequency circuit
130 Storage unit
131 Directional pattern table
132 Threshold table
140 Controller
141 Threshold identifying unit
142 Directional pattern selecting unit
143 Threshold adjusting unit
150 Baseband processing circuit
160 MAC circuit
1201 Dashed line
1202 Solid line
1203 Dotted line

The invention claimed is:

1. A wireless communications apparatus which performs wireless communications with an external apparatus, said wireless communications apparatus comprising:
    an antenna having a directivity that is changeable;
    a storage unit configured to store a plurality of directional patterns and a plurality of thresholds, the directional patterns each indicating the directivity of said antenna, and the thresholds each being an expected value of a throughput obtained according to a first radio propagation environment parameter indicating a state of a radio propagation environment; and
    a controller which changes the directivity of said antenna based on a directional pattern selected from the directional patterns,
    wherein said controller includes:
    a threshold identifying unit configured to measure the first radio propagation environment parameter by using one of the directional patterns, and identify, from among the thresholds stored in said storage unit, a threshold corresponding to the measured first radio propagation environment parameter;
    a directional pattern selecting unit configured to:
        perform test communications by sequentially switching the directional patterns;
        measure a second radio propagation environment parameter for each of the directional patterns used for the test communications, the second radio propagation environment parameter being different from the first radio propagation environment parameter; and
        select, from among the directional patterns, a directional pattern having an actual throughput that is greater than the threshold, the actual throughput being calculated from a measurement value of the second radio propagation environment parameter; and
    a threshold adjusting unit configured to change the threshold identified by said threshold identifying unit, according to the number of test communications that is the number of the directional patterns used for the test communications performed by said directional pattern selecting unit.

2. The wireless communications apparatus according to claim 1,
    wherein said threshold adjusting unit is configured to decrease the threshold when the number of test communications is equal to or greater than a first value, and increase the threshold when the number of test communications is equal to or smaller than a second value.

3. The wireless communications apparatus according to claim 1,
    wherein said directional pattern selecting unit is configured to store, into said storage unit, (i) a measurement value of the first radio propagation environment parameter measured by said threshold identifying unit and (ii) the number of test communications performed before the directional pattern is selected, the measurement value and the number of test communications being stored as a test result in association with each other each time the directional pattern is selected, and said threshold adjusting unit is configured to change the threshold when the test result stored in said storage unit matches a predetermined criterion.

4. The wireless communications apparatus according to claim 3, wherein said threshold adjusting unit is configured to determine that a plurality of the test results match the predetermined criterion when the number of test communications is consecutively equal to or smaller than a predetermined value, and to increase the threshold, the plurality of the test results having the same measurement value of the first radio propagation environment parameter.

5. The wireless communications apparatus according to claim 1, wherein, when the throughput of each of the directional patterns is equal to or smaller than the threshold, said directional pattern selecting unit is configured to select, from among the directional patterns, a directional pattern which provides a highest throughput.

6. The wireless communications apparatus according to claim 1, wherein the first radio propagation environment parameter is a received signal strength indicator of said antenna.

7. The wireless communications apparatus according to claim 6, wherein said threshold identifying unit is configured to measure the received signal strength indicator of said antenna by using a directional pattern having a lowest directivity among the directional patterns.

8. The wireless communications apparatus according to claim 1, wherein the second radio propagation environment parameter is a packet error rate of a packet received by said antenna.

9. The wireless communications apparatus according to claim 8, wherein said directional pattern selecting unit is configured to calculate the packet error rate based on a signal power to noise power (S/N) ratio of said antenna and a transmission rate of the wireless communications.

10. The wireless communications apparatus according to claim 1, wherein said controller always monitors a change in the radio propagation environment, and starts selecting the directional pattern when a range of the change in the radio propagation environment exceeds a predetermined acceptable range.

11. The wireless communications apparatus according to claim 1, wherein said threshold adjusting unit is configured to halt changing the threshold for a predetermined period when the threshold is alternately increased and decreased for a predetermined number of times.

12. The wireless communications apparatus according to claim 1, further comprising:

a plurality of said antennas, wherein the directional pattern indicates a combination of directivities of said antennas.

13. A method of performing wireless communications with an external apparatus, said method being performed by a wireless communications apparatus which includes an antenna and a storage unit, the antenna having a directivity that is changeable, the storage unit storing a plurality of directional patterns and a plurality of thresholds, the directional patterns each indicating the directivity of the antenna, the thresholds each being an expected value of a throughput obtained according to a first radio propagation environment parameter indicating a state of a radio propagation environment, said method comprising:

measuring the first radio propagation environment parameter by using one of the directional patterns, and identifying, from among the thresholds stored in said storage unit, a threshold corresponding to the measured first radio propagation environment parameter;

(i) performing test communications by sequentially switching the directional patterns, (ii) measuring a second radio propagation environment parameter for each of the directional patterns used for the test communications, the second radio propagation environment parameter being different from the first radio propagation environment parameter, (iii) selecting, from among the directional patterns, a directional pattern having an actual throughput that is greater than the threshold, the actual throughput being calculated from a measurement value of the second radio propagation environment parameter, and (iv) causing the antenna to perform the wireless communications with the selected directional pattern; and changing the threshold identified in said identifying, according to the number of test communications that is the number of the directional patterns used for the test communications performed in said performing.

14. A non-transitory computer-readable recording medium for use in a computer and having a computer program recorded thereon, the computer including an antenna and a storage unit, the antenna having a directivity that is changeable, the storage unit storing a plurality of directional patterns and a plurality of thresholds, the directional patterns each indicating the directivity of the antenna, and the thresholds each being an expected value of a throughput obtained according to a first radio propagation environment parameter indicating a state of a radio propagation environment, the computer program causing the computer to perform wireless communications with an external apparatus and causing the computer to execute:

measuring the first radio propagation environment parameter by using one of the directional patterns, and identifying, from among the thresholds stored in said storage unit, a threshold corresponding to the measured first radio propagation environment parameter;

(i) performing test communications by sequentially switching the directional patterns, (ii) measuring a second radio propagation environment parameter for each of the directional patterns used for the test communications, the second radio propagation environment parameter being different from the first radio propagation environment parameter, (iii) selecting, from among the directional patterns, a directional pattern having an actual throughput that is greater than the threshold, the actual throughput being calculated from a measurement value of the second radio propagation environment parameter, and (iv) causing the antenna to perform the wireless communications with the selected directional pattern; and changing the threshold identified in said identifying, according to the number of test communications that is the number of the directional patterns used for the test communications performed in said performing.

15. An integrated circuit which causes a wireless communications apparatus to perform wireless communications with an external apparatus, the wireless communications apparatus including an antenna and a storage unit, the antenna having a directivity that is changeable, the storage unit storing a plurality of directional patterns and a plurality of thresholds, the directional patterns each indicating the directivity of the antenna, and the thresholds each being an expected value of a throughput obtained according to a first radio propagation environment parameter indicating a state of a radio propagation environment, said integrated circuit comprising:

a threshold identifying unit configured to measure the first radio propagation environment parameter by using one of the directional patterns, and identify, from among the thresholds stored in said storage unit, a threshold corresponding to the measured first radio propagation environment parameter;

a directional pattern selecting unit configured to:
perform test communications by sequentially switching the directional patterns;
measure a second radio propagation environment parameter for each of the directional patterns used for the test communications, the second radio propagation environment parameter being different from the first radio propagation environment parameter; and
select, from among the directional patterns, a directional pattern having an actual throughput that is greater than the threshold, the actual throughput being calculated from a measurement value of the second radio propagation environment parameter; and a threshold adjusting unit configured to change the threshold identified by the threshold identifying unit, according to the number of test communications that is the number of the directional patterns used for the test communication performed by the directional pattern selecting unit.

* * * * *